(12) United States Patent
Chen

(10) Patent No.: US 11,165,898 B2
(45) Date of Patent: Nov. 2, 2021

(54) MOBILE TERMINAL, VIBRATION CONTROL METHOD AND DEVICE, AND STORAGE MEDIUM

(71) Applicant: Beijing Xiaomi Mobile Software Co., Ltd., Beijing (CN)

(72) Inventor: Chaoxi Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/881,771

(22) Filed: May 22, 2020

(65) Prior Publication Data

US 2021/0176352 A1    Jun. 10, 2021

(30) Foreign Application Priority Data

Dec. 6, 2019   (CN) .......................... 201911243291.6

(51) Int. Cl.
*H04M 1/02*     (2006.01)
*G08B 6/00*     (2006.01)

(52) U.S. Cl.
CPC .......... *H04M 1/0268* (2013.01); *G08B 6/00* (2013.01); *H04M 1/0216* (2013.01)

(58) Field of Classification Search
CPC ...... H04M 1/0268; H04M 1/0216; G08B 6/00
See application file for complete search history.

(56) References Cited

U.S. PATENT DOCUMENTS

| 2015/0062025 A1* | 3/2015 | Lee ................. G06F 1/1684 345/173 |
| 2018/0035208 A1* | 2/2018 | Choi ................. G06F 3/165 |

FOREIGN PATENT DOCUMENTS

| JP | 2009217415 A | 9/2009 |
| KR | 20150026537 A | 3/2015 |
| KR | 20160108705 A | 9/2016 |

OTHER PUBLICATIONS

European Search Report in European Application No. 20180162.8, dated Dec. 15, 2020.

(Continued)

*Primary Examiner* — Ankur Jain
*Assistant Examiner* — Angelica M Perez
(74) *Attorney, Agent, or Firm* — Finnegan, Henderson, Farabow, Garrett & Dunner, L.L.P.

(57) ABSTRACT

A mobile terminal includes: a shell; a display screen arranged on a surface of the shell, the display screen including first and second display regions; a first vibration component, arranged in the shell and on a back surface of the first display region; a second vibration component, arranged in the shell and on a back surface of the second display region; a processor, arranged in the shell and configured to determine a form of the display screen, the display screen having a folded and unfolded form, the first and second display regions being overlapped in the folded form and separated in the unfolded form; and a controller, arranged in the shell and connected with the processor and the first and second vibration components, the controller being configured to control vibration amplitudes of the first and the second vibration components according to the determined form of the display screen.

18 Claims, 19 Drawing Sheets

(56) References Cited

OTHER PUBLICATIONS

Notification of Reason for Refusal dated Jul. 21, 2021, from the Korean Intellectual Property Office in counterpart Korean Application No. 10-2020-0066817.
Notice of Reasons for Refusal dated Aug. 12. 2021, from the Japanese Patent Office in counterpart Japanese Application No. 2020-097448.

* cited by examiner

MOBILE TERMINAL, VIBRATION CONTROL METHOD AND DEVICE, AND STORAGE MEDIUM

CROSS-REFERENCE TO RELATED APPLICATION

This application is based upon and claims priority to Chinese Patent Application No. 201911243291.6, filed on Dec. 6, 2019, the entire content of which is incorporated herein by reference.

TECHNICAL FIELD

The present disclosure generally relates to the technical field of mobile terminals, and more particularly, to a mobile terminal, a vibration control method and device, and a storage medium.

BACKGROUND

Vibration is one of commonly used functions of a mobile terminal. For example, when a mobile terminal receives an incoming call or a short message, the mobile terminal may prompt a user by vibration such that the user can timely check the mobile terminal.

However, some mobile terminals with folding screens may provide inconsistent vibration senses during vibration, resulting in degraded user experience. Therefore, how to improve a vibration effect of a mobile terminal with a folding screen is a problem to be further solved.

SUMMARY

According to a first aspect of embodiments of the present disclosure, a mobile terminal may include: a shell, a display screen arranged on a surface of the shell, the display screen including a first display region and a second display region; a first vibration component, arranged in the shell and on a back surface of the first display region; a second vibration component, arranged in the shell and on a back surface of the second display region; a processor, arranged in the shell and configured to determine a form of the display screen, the display screen having a folded form and an unfolded form, the first display region and the second display region are overlapped in the folded form and the first display region and the second display region being separated in the unfolded form; and a controller, arranged in the shell and connected with the processor, the first vibration component, and the second vibration component, the controller being configured to control vibration amplitudes of the first vibration component and the second vibration component according to the determined form of the display screen.

According to a second aspect of the embodiments of the present disclosure, a vibration control method may include: determining a form of a display screen of a mobile terminal, wherein the display screen includes a first display region and a second display region, and has a folded form and an unfolded form, wherein the first display region and the second display region are overlapped in the folded form, and the first display region and the second display region are separated in the unfolded form; and controlling vibration amplitudes of a first vibration component arranged on a back surface of the first display region and a second vibration component arranged on a back surface of the second display region according to the determined form of the display screen.

According to a third aspect of the embodiments of the present disclosure, a vibration control device may include: a processor; and a memory configured to store instructions executable by the processor, wherein the processor may be configured to perform the vibration control method according to the second aspect.

According to a fourth aspect of the embodiments of the present disclosure, a non-transitory computer-readable storage medium has stored thereon instructions that, when executed by a processor of a mobile terminal, cause the mobile terminal to perform the vibration control method according to the second aspect.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
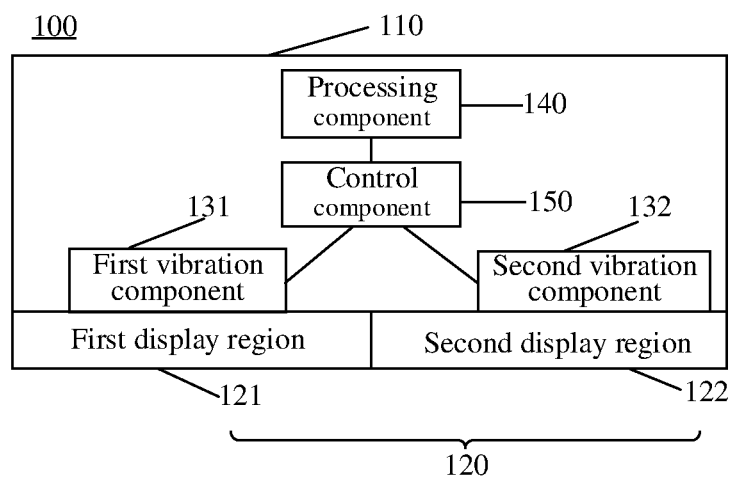
FIG. 1 is a block diagram of a mobile terminal according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The exemplary embodiments in the following description do not represent all embodiments consistent with the present disclosure. Instead, they are merely examples of apparatuses and methods consistent with aspects related to the present disclosure as recited in the appended claims.

With the development of electronic device technologies, a display screen with a folding display region is one of development trends. A display screen may include a first display region and a second display region. The display screen may have a folded form and an unfolded form. In the folded form, the first display region and the second display region are overlapped. In the unfolded form, the first display region and the second display region are separated.

A vibration component arranged on a back surface of a display region may usually be controlled to vibrate to enable the display region to vibrate.

When a first vibration component on a back surface of the first display region vibrates, the first vibration component may apply a first acting force to the first display region, and the first display region may vibrate under the action of the first acting force.

When a second vibration component on a back surface of the second display region vibrates, the second vibration component may apply a second acting force to the second display region, and the second display region may vibrate under the action of the second acting force.

When the display screen is in the unfolded form and both the first vibration component and the second vibration component vibrate according to a preset vibration mode, an interaction force between the first display region and the second display region can be weaker. In such a case, the first display region and the second display region may also vibrate according to the preset vibration mode.

When the display screen is in the folded form, if both the vibration component and the second vibration component vibrate, the interaction force between the first display region and the second display region can be strengthened to increase vibration amplitudes of the first display region and the second display region. A vibration amplitude of a mobile terminal with the display screen in the folded form may be higher than the vibration amplitude of the mobile terminal with the display screen in the unfolded form. As a result, vibration senses experienced by a user in the folded form and unfolded form of the display screen may be different.

That is, in the related art, a user holding a mobile device with a foldable display screen may have greatly different experiences of vibration senses when the display screen is in the unfolded form and the display screen is in the folded form, which is unfavorable for improving user experience.

FIG. 1 is a schematic diagram illustrating a mobile terminal 100 according to some embodiments. As shown in FIG. 1, the mobile terminal 100 may include: a shell 110; a display screen 120 arranged on a surface of the shell 110, including a first display region 121 and a second display region 122; a first vibration component 131 arranged in the shell 110 and on a back surface of the first display region 121; and a second vibration component 132 arranged in the shell 110 and on a back surface of the second display region 122.

The mobile terminal 100 may also include a processing component 140 (e.g., a processor) arranged in the shell 110, configured to determine a form of the display screen 120, wherein the display screen 120 has a folded form and an unfolded form, the first display region 121 and the second display region 122 are overlapped in the folded form, and the first display region 121 and the second display region 122 are separated in the unfolded form.

The mobile terminal 100 may also include a control component 150 (e.g., a controller) arranged in the shell 110 and connected with the processing component 140, the first vibration component 131, and the second vibration component 132, the control component 150 being configured to control vibration amplitudes of the first vibration component 131 and the second vibration component 132 according to the form of the display screen 120. In some embodiments, the processing component 140 and the control component 150 may be implemented with the same processor.

When the first display region 121 and the second display region 122 are overlapped, the first display region 121 may be arranged on a first surface of the mobile terminal 100, and the second display region 122 may be arranged on a second surface of the mobile terminal 100, the first surface of the mobile terminal 100 and the second surface of the mobile terminal 100 being opposite surfaces.

When the first display region 121 and the second display region 122 are separated, an orientation of a display surface of the first display region 121 may be consistent with an orientation of a display surface of the second display region 122. For example, both the display surface of the first display region 121 and the display surface of the second display region 122 may face a user. When the first display region 121 and the second display region 122 are separated, the orientation of the display surface of the first display region 121 may form a certain included angle with the orientation of the display surface of the second display region 122.

In the embodiment, the form of the display screen may be determined through the processing component, and the vibration amplitudes of the first vibration component and the second vibration component may be controlled according to the form of the display screen to further control a vibration amplitude of the mobile terminal, so that a requirement on control over the vibration amplitude of the mobile terminal in different forms of the display screen may be met, consistency of vibration senses provided by the mobile terminal when the display screen is in the folded form and in the unfolded form can be improved, and user experience can be improved.

In some embodiments, the shell 100 may include: a rear cover and a middle frame; and the first vibration component 131 and the second vibration component 132 are arranged on the middle frame, or arranged in different edge regions of the rear cover.

The rear cover may include a cover body configured to support or bear various parts in the mobile terminal.

A first region of the rear cover may be parallel to the first display region, and a second region of the rear cover may be parallel to the second display region. The first vibration component may be arranged in an edge region of the first region of the rear cover, and the second vibration component may be arranged in an edge region of the second region of the rear cover.

Compared with arranging the first vibration component in a middle region of the first region of the rear cover, arranging the first vibration component in the edge region of the first region of the rear cover may drive the rear cover more easily to make an obvious vibration, which is favorable for ensuring a vibration effect.

The middle frame may be perpendicular to a plane where the rear cover is, may surround an edge of the rear cover and may be configured for arrangement of a part such as a button and a jack.

For enabling a user to sense vibration more obviously, the first vibration component may be arranged at a place, contacting with the middle frame, on the back surface of the first display region, and the second vibration component may be arranged at a place, contacting with the middle frame, on the back surface of the second display region. When the first vibration component vibrates, the first display region and the middle frame may be driven to vibrate, such that a part of the user holding the mobile terminal or contacting with the mobile terminal, such as a hand, may sense the vibration more obviously.

In some embodiments, the control component 150 is configured to, when the display screen 120 is in the unfolded form, control the first vibration component 131 and the second vibration component 132 to vibrate at a first vibration amplitude.

The control component 150 is further configured to, when the display screen 120 is in the folded form, control the first vibration component 131 or the second vibration component 132 to vibrate at the first vibration amplitude; and the control component 150 is further configured to, when the display screen 120 is in the folded form, control the first vibration component 131 and the second vibration component 132 to vibrate at a second vibration amplitude, the second vibration amplitude being lower than the first vibration amplitude.

When the display screen is in the folded form, the control component 150 may control the first vibration component 131 or the second vibration component 132 to vibrate at the first vibration amplitude or control the first vibration component 131 and the second vibration component 132 to vibrate at the second vibration amplitude lower than the first vibration amplitude, so that the interaction force between the first display region 121 and the second display region 122 during vibration can be reduced, the impact of the interaction force on a vibration amplitude of the first display region 121 or a vibration amplitude of the second display region 122 can be reduced, and the consistency of the vibration amplitudes when the display screen 120 is in the folded form and in the unfolded form can be improved, namely the consistency of vibration senses when the display screen 120 is in the folded form and in the unfolded form can be improved.

In addition, compared with only controlling the first vibration component 131 or the second vibration component 132 to vibrate when the display screen is in the unfolded form to cause vibration sense deficiency, controlling both the first vibration component 131 and the second vibration component 132 to vibrate when the display screen 120 is in the unfolded form may avoid vibration sense deficiency that is only one display region vibrates while the other display region does not vibrate in the unfolded form of the display screen 120, which is favorable for ensuring the vibration effect.

In some embodiments, the mobile terminal 100 may further include: a state acquisition component, arranged in the shell 110 and connected with the control component 150, configured to acquire a state of the first display region 121 and a state of the second display region 122 when the display screen 120 is in the folded form, each of the state of the first display region 121 and the state of the second display region 122 including a working state and an idle state.

The control component 150 is configured to control the first vibration component 131 to vibrate, when the display screen 120 is in the folded form, the first display region 121 is in the working state and the second display region 122 is in the idle state.

The control component 150 is further configured to control the second vibration component 132 to vibrate, when the display screen 120 is in the folded form, the first display region 121 is in the idle state and the second display region 122 is in the working state.

The state acquisition component may acquire the state of the first display region 121 and the state of the second display region 122 in a manner of acquiring power consumption of the first display region 121 and the second display region 122 and comparing the power consumption of the first display region 121 and the power consumption of the second display region 122 with preset power consumption. Herein, the preset power consumption may represent minimum power consumption required by the display region in the working state.

For example, when the power consumption of the first display region 121 is higher than the preset power consumption, the first display region 121 may be in the working state. When the power consumption of the first display region 121 is lower than the preset power consumption, the first display region 121 may be in the idle state.

When the power consumption of the second display region 122 is higher than the preset power consumption, the second display region 122 may be in the working state. When the power consumption of the second display region 122 is lower than the preset power consumption, the second display region 122 may be in the idle state.

In an embodiment, the working state may include a state that a user operation instruction may be received. For example, when the first display region 121 is in the working state, a video may be played in the first display region 121, and in such a case, a user may execute a pressing operation on a specific area of the first display region 121 to trigger the mobile terminal to pause the presently played video. Herein, the specific area of the first display region 121 may be a preset area capable of sensing the pressing operation.

It can be understood that, when the first display region 121 is in the working state, the display surface of the first display region 121 usually faces toward a user. When the second display region 122 is in the working state, the display surface of the second display region 122 usually faces toward a user.

In an embodiment, the idle state may include a state of displaying nothing or a state of displaying a specific picture, etc. For example, when the second display region 122 is in the idle state, displaying may be stopped in the second display region 122, or the specific picture may be displayed in the second display region 122. Herein, the specific picture may be a static picture or a dynamic picture set depending on a user requirement.

It is to be noted that, when the display screen 120 is in the folded form, the first display region 121 may be in the working state and the second display region 122 may be in the idle state, the display surface of the first display region 121 may face toward a user and the display surface of the second display region 122 may face away from the user.

When the display screen 120 is in the folded form, the first display region 121 may be in the idle state and the second display region 122 may be in the working state, the display surface of the first display region 121 may face away from the user and the display surface of the second display region 122 may face toward the user.

Compared with driving the vibration component on the back surface of the display region in the idle state to vibrate when the user is required to be prompted, a user may timely receive a vibration by acquiring both the state of the first display region 121 and the state of the second display region 122 in the folded form of the display screen 120 and, when the user is required to be prompted, controlling the vibration component on the back surface of the display region in the working state to vibrate.

Figure 2:
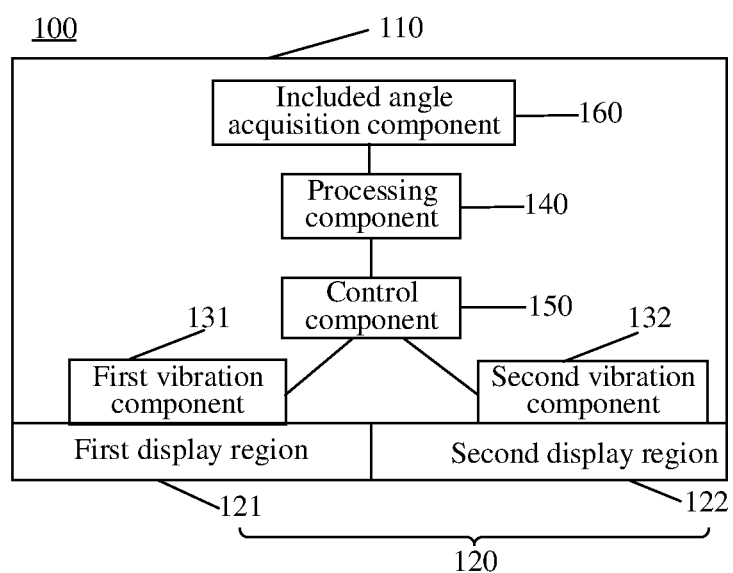
FIG. 2 is a block diagram of a mobile terminal according to some embodiments.

In some embodiments, as shown in FIG. 2, the mobile terminal 100 may further include: an included angle acquisition component 160, arranged in the shell 110 and connected with the processing component 140, configured to acquire an included angle between the first display region 121 and the second display region 122. In some embodiments, the processing component 140 and the included angle acquisition component 160 may be implemented with the same processor.

The processing component 140 is configured to, when the included angle between the first display region 121 and the second display region 122 is smaller than or equal to a first preset angle, determine that the display screen 120 is in the folded form.

The processing component 140 is further configured to, when an included angle between the orientation of the display surface of the first display region 121 and the orientation of the display surface of the second display region 122 is larger than the first preset angle, determine that the display screen 120 is in the unfolded form.

Herein, the included angle between the first display region 121 and the second display region 122 may be defined as an angle larger than or equal to 0 degree and smaller than or equal to 180 degrees.

For example, the included angle between the first display region 121 and the second display region 122 may include an included angle between the display surface of the first display region 121 and the display surface of the second display region 122, or an included angle between the display surface of the first display region 121 and the back surface of the second display region 122, or an included angle between the back surface of the first display region 121 and the display surface of the second display region 122, or an included angle between the back surface of the first display region 121 and the back surface of the second display region 122. The back surface of the first display region 121 may be an opposite side of the display surface of the first display region 121, and the back surface of the second display region 122 may be an opposite side of the display surface of the second display region 122.

In an embodiment, the first preset angle may be 90 degrees.

Figure 3A:
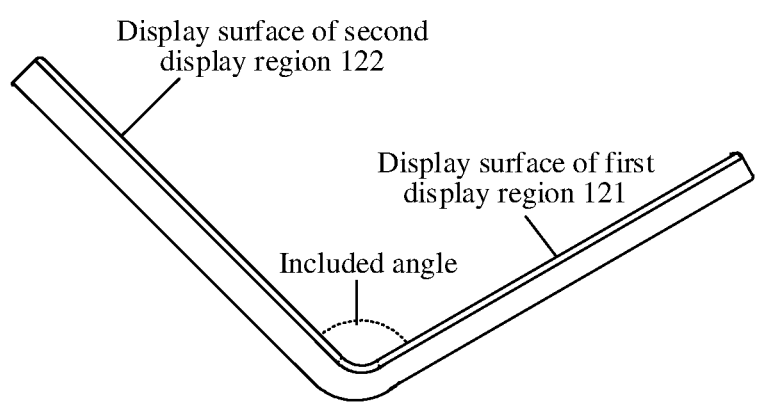
FIG. 3A is a schematic diagram illustrating a mobile terminal in an unfolded form according to some embodiments.

When the included angle between the display surface of the first display region 121 and the display surface of the second display region 122 is larger than 90 degrees and smaller than 180 degrees, the mobile terminal 100 may be in a form as shown in FIG. 3A. In such a case, the display screen 120 is in the unfolded form.

Figure 3B:
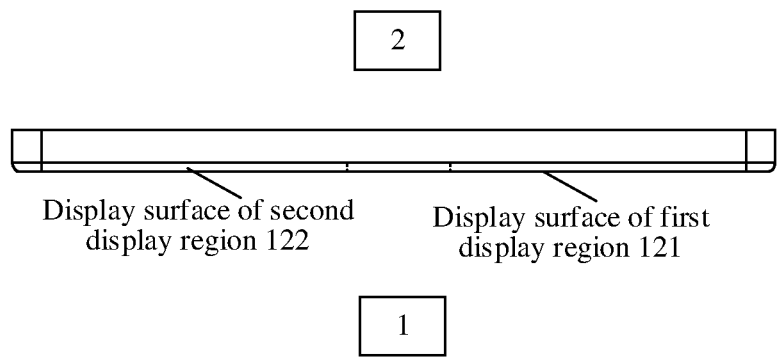
FIG. 3B is a schematic diagram illustrating a mobile terminal in an unfolded form according to some embodiments.

When the included angle between the display surface of the first display region 121 and the display surface of the second display region 122 is equal to 180 degrees, the mobile terminal 100 may be in a form as shown in FIG. 3B. In such a case, the display screen 120 is in the unfolded form.

Referring to FIG. 3B, when the eyes of a user are at a position "1", the display surface of the first display region 121 and the display surface of the second display region 122 face toward the user. In such a case, the first display region 121 and the second display region 122 may simultaneously implement displaying.

When the eyes of the user are at a position "2", the display surface of the first display region 121 and the display surface of the second display region 122 face away from the user. In such a case, the back surfaces of the first display region 121 and the second display region 122 face toward the user.

Figure 3C:
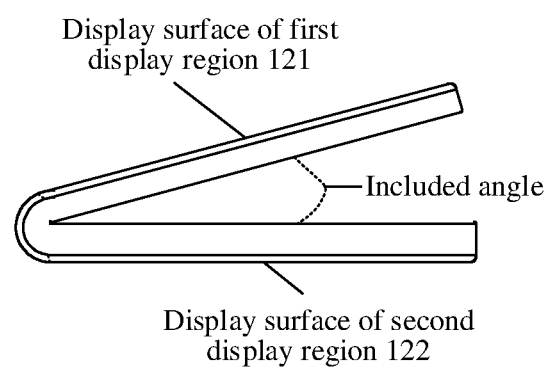
FIG. 3C is a schematic diagram illustrating a mobile terminal in a folded form according to some embodiments.

For example, when the included angle between the back surface of the first display region 121 and the back surface of the second display region 122 is larger than 0 degree and smaller than 90 degrees, the mobile terminal 100 may be in a form as shown in FIG. 3C. In such a case, the display screen 120 is in the folded form. When the included angle between the back surface of the first display region 121 and the back surface of the second display region 122 is equal to 0 degree, the mobile terminal 100 may be in a form as shown in FIG. 3D.

Figure 3D:
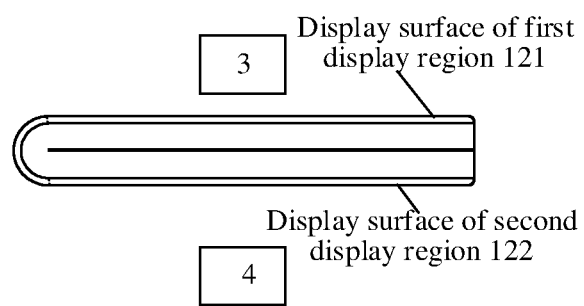
FIG. 3D is a schematic diagram illustrating a mobile terminal in a folded form according to some embodiments.

Referring to FIG. 3D, when the eyes of the user are at a position "3", the display surface of the first display region 121 faces toward the user and the display surface of the second display region 122 faces away from the user. In such a case, the first display region 121 is often in the working state and the second display region 122 is often in the idle state.

When the eyes of the user are at a position "4", the display surface of the first display region 121 faces away from the user and the display surface of the second display region 122 faces toward the user. In such a case, the first display region 121 is usually in the idle state and the second display region 122 is usually in the working state.

In the embodiments of the present disclosure, the included angle between the first display region 121 and the second display region 122 may be acquired, and the form of the display screen may be determined according to the included angle between the first display region 121 and the second display region 122 to further control the vibration amplitudes of the first vibration component 131 and the second vibration component 132.

In some embodiments, the included angle acquisition component 160 may include: a first angular velocity sensor, arranged on the back surface of the first display region 121, configured to acquire an attitude angle parameter of the first display region 121, and a second angular velocity sensor, arranged on the back surface of the second display region 122, configured to acquire an attitude angle parameter of the second display region 122.

The included angle acquisition component 160 is configured to determine the included angle between the first display region 121 and the second display region 122 according to the attitude angle parameter of the first display region 121 and the attitude angle parameter of the second display region 122.

Both the first angular velocity sensor and the second angular velocity sensor may be gyroscopes. The attitude angle parameter of the first display region 121 is configured to represent a rotation angle of the first display region 121. The attitude angle parameter of the second display region 122 is configured to represent a rotation angle of the second display region 122.

In an embodiment, the mobile terminal 100 may pre-store the attitude angle parameter of the first display region 121 and attitude angle parameter of the second display region 122, acquired when a previous driving signal is generated, as well as a driving result of the previous driving signal. Based on the previous driving result, the vibration component that vibrates when the previous driving signal is generated may be determined.

In an embodiment, when the previous driving result is controlling the first vibration component 131 and the second vibration component 132 to vibrate at the first vibration amplitude, the display screen 120 may be in the unfolded form during previous vibration. Furthermore, a presently acquired attitude angle parameter of the first display region 121 may be compared with a previously acquired attitude angle parameter of the first display region 121 to determine a change of an attitude angle of the first display region 121 relative to that when the previous driving signal is generated. A presently acquired attitude angle parameter of the second display region 122 may be compared with a previously acquired attitude angle parameter of the second display region 122 to determine a change of an attitude angle of the second display region 122 relative to that when the previous driving signal is generated. In such a manner, a change value of the included angle between the first display region 121 and the second display region 122 relative to that when the previous driving signal is generated may be determined, namely a present included angle between the first display region 121 and the second display region 122 may be determined.

In the embodiments of the present disclosure, the attitude angle parameter of the first display region 121 and the attitude angle parameter of the second display region 122 may be acquired, and the included angle between the first display region 121 and the second display region 122 may be determined according to the attitude angle parameter of the first display region 121 and the attitude angle parameter of the second display region 122.

In some embodiments, the included angle acquisition component 160 may further include: a first acceleration sensor, arranged on the back surface of the first display region 121, configured to acquire an acceleration of the first display region 121, and a second acceleration sensor, arranged on the back surface of the second display region 122, configured to acquire an acceleration of the second display region 122.

The included angle acquisition component 160 is configured to determine the included angle between the first display region 121 and the second display region 122 according to a direction of the acceleration of the first display region 121, the attitude angle parameter of the first display region 121, a direction of the acceleration of the second display region 122 and the attitude angle parameter of the second display region 122.

In an embodiment, the included angle acquisition component 160 may judge whether a direction of the acceleration of the first display region 121 is consistent with a direction of the acceleration of the second display region 122 to determine whether the orientation of the display surface of the first display region 121 is consistent with the orientation of the display surface of the second display region 122 to further determine the form of the display screen 120.

For example, when a direction of the acceleration of the first display region 121 is consistent with a direction of the acceleration of the second display region 122, the orientation of the display surface of the first display region 121 can be consistent with the orientation of the display surface of the second display region 122, and the display screen 120 may be in the unfolded form.

When a direction of the acceleration of the first display region 121 is opposite to a direction of the acceleration of the second display region 122, the orientation of the display surface of the first display region 121 may be opposite to the orientation of the display surface of the second display region 122, and the display screen 120 may be in the folded form.

For example, a z-axis component direction of an acceleration of the first display region 121 and a z-axis component direction of an acceleration of the second display region 122 in a three-dimensional coordinate system may be determined according to a direction of the acceleration of the first display region 121, the attitude angle parameter of the first display region 121, a direction of the acceleration of the second display region 122, and the attitude angle parameter of the second display region 122. Herein, it may be considered that the three-dimensional coordinate system is a geographic coordinate system and a positive z-axis direction may be opposite to a gravity direction of the mobile terminal 100.

When the z-axis component direction of the acceleration of the first display region 121 is consistent with the positive z-axis direction and the z-axis component direction of the acceleration of the second display region 122 is consistent with the positive z-axis direction, it may be determined that the display screen 120 is in the unfolded form and that both the display surface of the first display region 121 and the display surface of the second display region 122 face away from a user.

When the z-axis component direction of the acceleration of the first display region 121 is opposite to the positive z-axis direction and the z-axis component direction of the acceleration of the second display region 122 is opposite to the positive z-axis direction, it may be determined that the display screen 120 is in the unfolded form and that both the display surface of the first display region 121 and the display surface of the second display region 122 face toward a user.

When the z-axis component direction of the acceleration of the first display region 121 is consistent with the positive z-axis direction and the z-axis component direction of the acceleration of the second display region 122 is opposite to the positive z-axis direction, it may be determined that the display screen 120 is in the folded form, the display surface of the first display region 121 faces away from a user and the display surface of the second display region 122 faces toward the user. In such a case, when vibration is needed, the second vibration component 132 on the back surface of the second display region 122 may be controlled to vibrate at the first vibration amplitude.

When the z-axis component direction of the acceleration of the first display region 121 is opposite to the positive z-axis direction and the z-axis component direction of the acceleration of the second display region 122 is consistent with the positive z-axis direction, it may be determined that the display screen 120 is in the folded form, the display surface of the first display region 121 faces toward the user and the display surface of the second display region 122 faces away from the user. In such a case, when vibration is needed, the first vibration component 131 on the back surface of the first display region 121 may be controlled to vibrate at the first vibration amplitude.

According to the direction of the acceleration of the first display region 121, the attitude angle parameter of the first display region 121, the direction of the acceleration of the second display region 122, and the attitude angle parameter of the second display region 122, the accuracy of determining the included angle between the first display region 121 and the second display region 122 may be improved, and the vibration control accuracy may further be improved.

In some embodiments, the control component 150 is configured to generate a driving signal for controlling the vibration amplitudes of the first vibration component 131 and the second vibration component 132 according to the form of the display screen 120.

In some embodiments, the processing component 140 is configured to generate a control signal according to the form of the display screen 120 and send the control signal to the control component 150, and the control component 150 is configured to generate a driving signal for controlling the vibration amplitudes of the first vibration component 131 and the second vibration component 132 according to the control signal.

Figure 4:
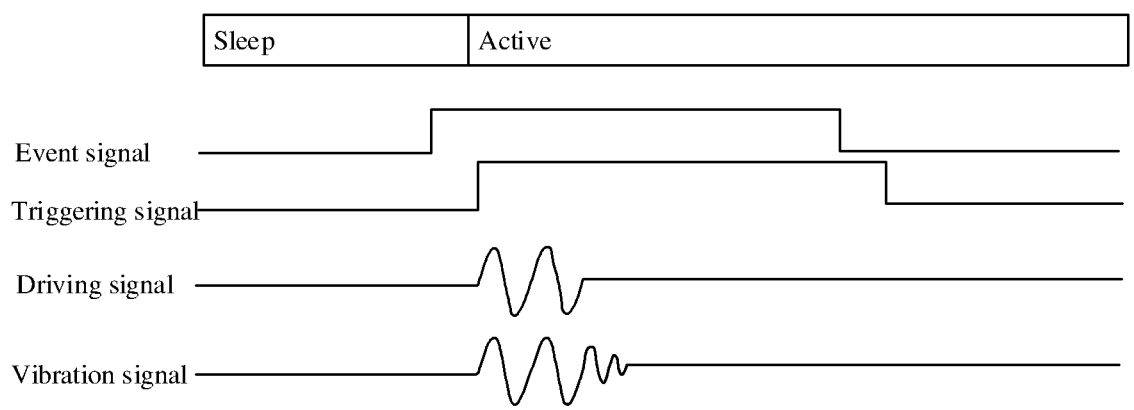
FIG. 4 is a schematic diagram illustrating a signal curve according to some embodiments.

When the control component 150 of the mobile terminal 100 has a triggering pin and is connected with the first vibration component 131 or the second vibration component 132 through the triggering pin, the control component 150 may directly generate a driving signal for controlling the vibration amplitudes of the first vibration component 131 and the second vibration component 132 according to the form of the display screen 120. That is, control over the vibration amplitudes of the first vibration component 131 and the second vibration component 132 may be directly triggered through hardware. A signal curve involved in such a control manner is as shown in FIG. 4. An event signal represents a user operation signal; a triggering signal represents a triggering signal generated by the mobile terminal 100 responsive to detecting the user operation signal; and vibration signal represents a vibration signal of the first vibration component 131 and/or the second vibration component 132.

Figure 5:
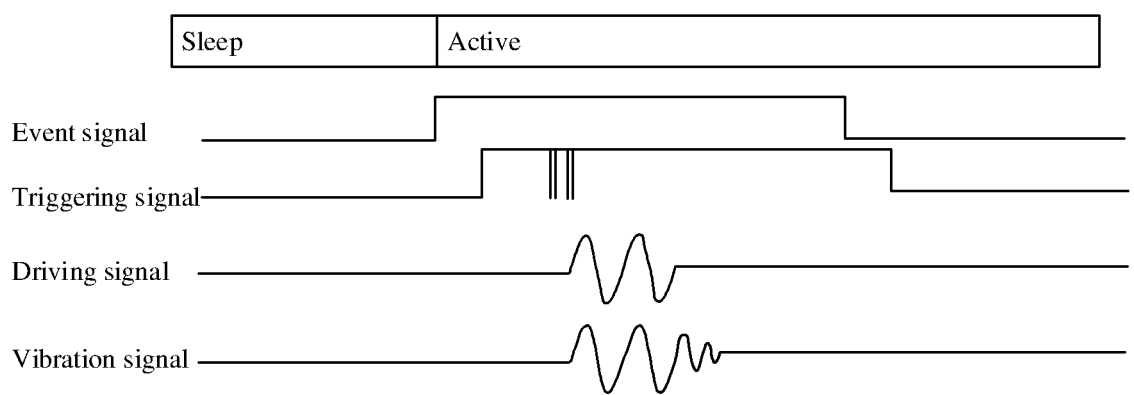
FIG. 5 is a schematic diagram illustrating a signal curve according to some embodiments.

In some embodiments, the processing component 140 of the mobile terminal 100 may generate a control signal according to the form of the display screen 120 and send the control signal to the control component 150 of the mobile terminal 100, and the control component 150 may generate a driving signal for controlling the vibration amplitudes of the first vibration component 131 and the second vibration component 132 according to the control signal. That is, the control signal may be sent to the control component 150 through a first interface to implement vibration control. A signal waveform curve involved in such a control manner is as shown in FIG. 5. The first interface may be a communication interface and may include an Inter-Integrated Circuit (I2C) interface or a Serial Peripheral Interface (SPI).

When the control component 150 is connected with the processing component 140 through the first interface, the processing component 140 may also initialize the control component 150 through the first interface and store a waveform signal of required vibration in the control component 150, so that a hardware basis is provided for achievement of a specific vibrational touch effect.

The control component may directly generate a driving signal in a hardware triggering manner to control the vibration amplitudes of the first vibration component and the second vibration component, so that a vibration response of the mobile terminal is quickened.

The processing component 140 may generate a control signal and send the control signal to the control component 150 through the communication interface to enable the control component 150 to generate a driving signal. Various manners can be adopted for generating the driving signal, and a control manner can be flexible.

In some embodiments, the control component 150 is configured to generate a driving signal with a first signal value.

The mobile terminal 100 may further include a conversion component, configured to convert the driving signal with the first signal value into a driving signal with a second signal value, the second signal value being greater than the first signal value.

The driving signal with the second signal value is configured to control the vibration amplitudes of the first vibration component 131 and the second vibration component 132. The driving signal with the second signal value, compared with the driving signal with the first signal value, may generate a stronger vibration damping force when the first vibration component 131 and/or the second vibration component 132 start vibration or stop vibration.

In an embodiment, the conversion component may include a portion with a boosting function, for example, an operational amplifier. In such a case, the driving signal may be a voltage signal.

In an embodiment, the first vibration component 131 may be controlled by the driving signal to rotate. When a first differential signal and a second differential signal are input into the first vibration component 131 as driving signals through a pair of differential signal lines, a signal generated by calculating a difference of the two paths of differential signals in the pair of differential signal lines may generate an alternating magnetic field in a coil of the first vibration component. Under the action of the alternating magnetic field, a mass block with a magnetic substance in the first vibration component 131 may be driven to make a periodical motion along with change of the magnetic field.

Figure 6:
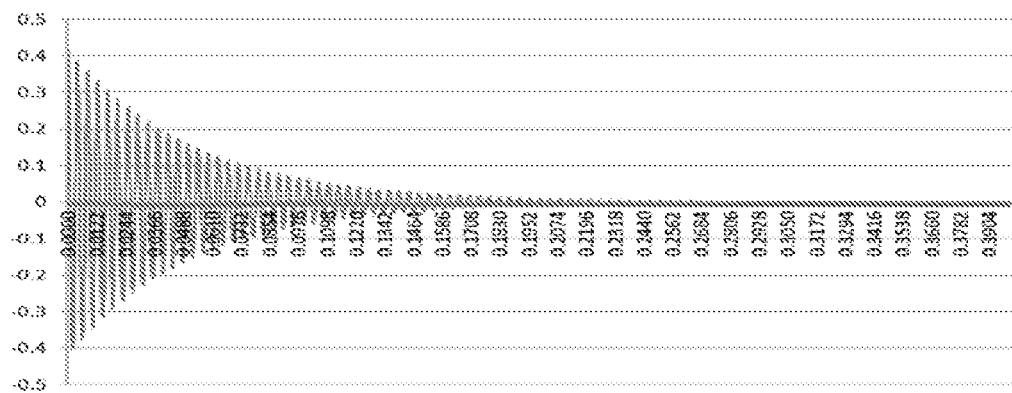
FIG. 6 is a schematic diagram illustrating a freely damped motion according to some embodiments.
Figure 7:
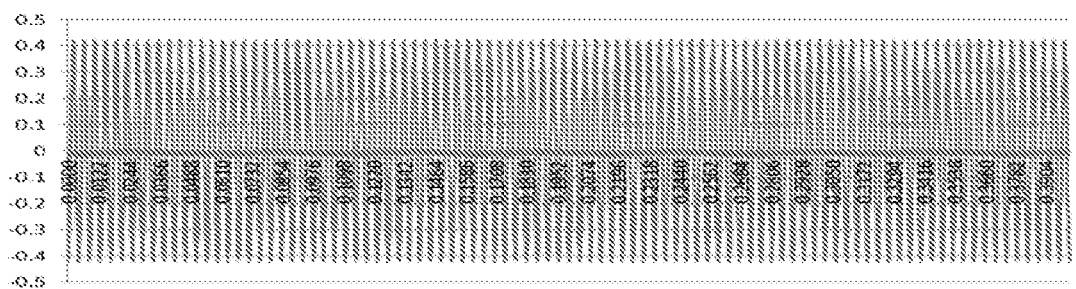
FIG. 7 is a schematic diagram illustrating a steady motion according to some embodiments.

A vibration start process of the mass block may include a superposition of two parts of motions, i.e., a superposition of a freely damped motion (shown in FIG. 6) under the action of the damping force and a steady motion (shown in FIG. 7) under the action of a driving force generated by the driving signal. A formed superposition result is a waveform shown in FIG. 8. A vibration stop process of the mass block in the first vibration component may include a freely damped motion under the action of the vibration damping force, as shown in FIG. 9.

Therefore, for a transient process, regardless of a vibration stopping stage or a vibration starting stage, a damping ratio of the first vibration component 131 may be adjusted to change the vibration damping force to further adjust the vibration starting time and the vibration stopping time. Moreover, the stronger the vibration damping force is, the shorter the vibration starting time and the vibration stopping time are.

Figure 10:
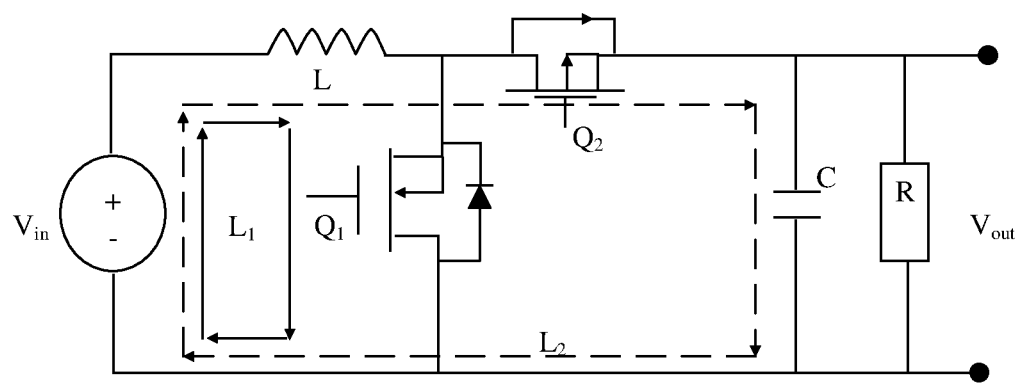
FIG. 10 is a schematic diagram illustrating a conversion component according to some embodiments.

FIG. 10 is a schematic diagram illustrating a conversion component according to some embodiments. Referring to FIG. 10, L represents an inductor, configured to store electric energy when a circuit is switched on. A component $Q_1$ and a component $Q_2$ represent components with a switch function. For example, the component $Q_1$ and the component $Q_2$ may be Metal Oxide Semiconductor (MOS) transistors. An output voltage ($V_{out}$) of the conversion component and an input voltage ($V_{in}$) provided by a power supply may meet the following relationship:

$$V_{out}=V_{in}/(1-D)$$

where D represents a duty ratio which is a ratio of a duration of a high-level pulse signal to a cycle length of the pulse signal. For example, if the duration of the high-level pulse signal is 1 μs and the cycle length of the pulse signal is 4 μs, the duty ratio may be 0.25. In such a case, the duty ratio is greater than 0 and less than 1, and (1−D) is also greater than 0 and less than 1, so that the output voltage of the conversion component is higher than the input voltage input into the conversion component, namely the conversion component may realize the boosting function.

When the conversion component is in a first stage, the transistor $Q_1$ may be switched on, the transistor $Q_2$ may be switched off, a current may flow through a first loop ($L_1$), and the input voltage $V_{in}$ provided by the power supply may act on the inductor L to enable the inductor L to store the electric energy. The inductor L storing the electric energy may be considered as an induction power supply, and an induced voltage $V_L$ thereof may positive on the left and negative on the right. $Q_1$ and $Q_2$ may be controlled to be switched on or switched off through the same pulse signal.

After the inductor L is completely charged, the transistor $Q_1$ may be controlled to be switched off, and the transistor $Q_2$ may be controlled to be switched on. In such a case, the conversion component may be in a second stage, the current may flow through a second loop ($L_2$), and the inductor L may release the current. It can be understood according to the Lenz law that the induced voltage $V_L$ of the inductor L may change to be negative on the left and positive on the right, and a direction of the current released by the inductor L may be the same as a direction of an input current provided by the power supply. In such a case, the output voltage of the conversion component may be considered as a superposition of the input voltage provided by the power supply and the induced voltage of the inductor L, so that the output voltage of the conversion component is higher than the input voltage provided by the power supply, namely a boosting process is completed.

In an embodiment, the first vibration component may be controlled to vibrate. When the processing component of the mobile terminal controls a control part in the control component through the communication interface, the conversion component may convert the driving signal with the first signal value into the driving signal with the second signal value and transmit the driving signal with the second signal value to the first vibration component to apply a stronger driving force to the first vibration component. In such a case, the damping force subjected to the first vibration component may be also stronger, so that both the vibration starting time and vibration stopping time of the first vibration component can be reduced.

The signal value of the driving signal may be increased by the conversion component, the first vibration component 131 and/or the second vibration component 132 may be controlled by the driving signal with an increased signal value to vibrate. The driving signal with the second signal value, compared with the driving signal with the first signal value, may generate a stronger vibration damping force when the first vibration component 131 and/or the second vibration component 132 star/starts vibration or stop/stops vibration. Therefore, an amplitude fading speed of the freely damped motion under the action of the vibration damping force may be increased to enable the first vibration component 131 and/or the second vibration component 132 to enter a steady state faster, namely the vibration starting time is shortened.

In the vibration stop process, the first vibration component 131 and/or the second vibration component 132 may only perform freely damped motions under the action of the vibration damping force, so that the vibration stopping time of the first vibration component 131 and/or the second vibration component 132 is also shortened, along with increase of the amplitude fading speed of the freely damped motion.

Therefore, the vibration starting time and the vibration stopping time may be shortened, and a transient vibration effect of the mobile terminal may be improved.

In some embodiments, the mobile terminal 100 may further include: a detection component, connected with the first vibration component 131 and the second vibration component 132, configured to detect a vibration frequency of the first vibration component 131 and/or a vibration frequency of the second vibration component 132 to obtain a detection result.

The processing component 140 may be connected with the detection component and configured to adjust the driving signal for controlling the first vibration component 131 and/or the second vibration component 132 to vibrate based on the detection result to control the vibration frequency of the first vibration component 131 and/or the vibration frequency of the second vibration component 132 within a preset frequency range.

Herein, the preset frequency range may be from 100 hertz to 400 hertz.

Under a normal condition, if the vibration frequency of the first vibration component 131 is lower than 100 hertz, when the first display region 121 contacts with a human body, the human body may sense weak vibration and a vibration prompting effect is poor.

If the vibration frequency of the first vibration component 131 is higher than 400 hertz, when the first display region 121 contacts with the human body, the human body may feel a piercing pain like an electric shock and a user experience is poor.

Figure 11:
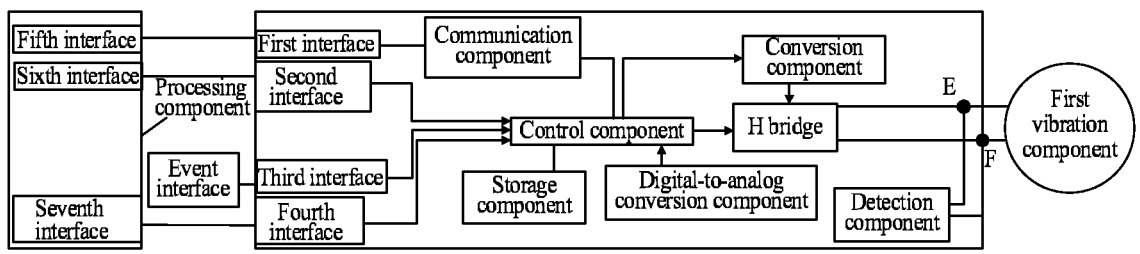
FIG. 11 is a schematic diagram of a part of a mobile terminal according to some embodiments.
Figure 12:
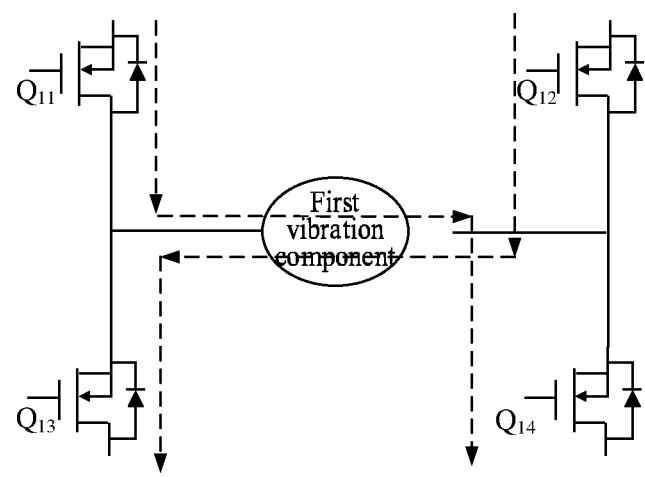
FIG. 12 is a schematic diagram of an H-bridge circuit according to some embodiments.

In an embodiment, the vibration frequency of the first vibration component 131 may be detected. FIG. 11 is a schematic diagram illustrating the detection component for detecting the vibration frequency of the first vibration component. As shown in FIG. 11, an electromotive force between a point E and a point F may be detected to detect a vibration effect of the first vibration component. As shown in FIG. 12, an H bridge is a circuit structure formed by an MOS transistor and may enable a vibration function of the first vibration component or disenable the vibration function of the first vibration component by Pulse Width Modulation (PWM) control.

For example, a control signal for controlling the first vibration component to vibrate may include two paths of differential signals, and the differential signals may be respectively transmitted to the first vibration component through a transmission line where the point E is and a transmission line where the point F is, and form the alternating magnetic field in the coil of the first vibration component. The detection component may detect a change of the alternating magnetic field to detect the vibration frequency of the first vibration component. In an embodiment, time stamps may be added into the driving signal, and the vibration frequency of the first vibration component may be calculated by Fast Fourier Transform (FFT) according to a voltage value detected between the point E and the point F and the corresponding time stamp.

When the calculated vibration frequency of the first vibration component is not in the preset frequency range, a driving frequency of the driving signal may be adjusted to control the vibration frequency of the first vibration component in the preset frequency range, namely locking the vibration frequency of the first vibration component. Moreover, a resonance frequency of the first vibration component may be detected under the action of driving signals with different driving frequencies. Herein, when the driving frequency of the driving signal is adjusted, a variation trend of the vibration frequency of the first vibration component may be the same as a variation trend of the driving frequency of the driving signal.

Figure 13:
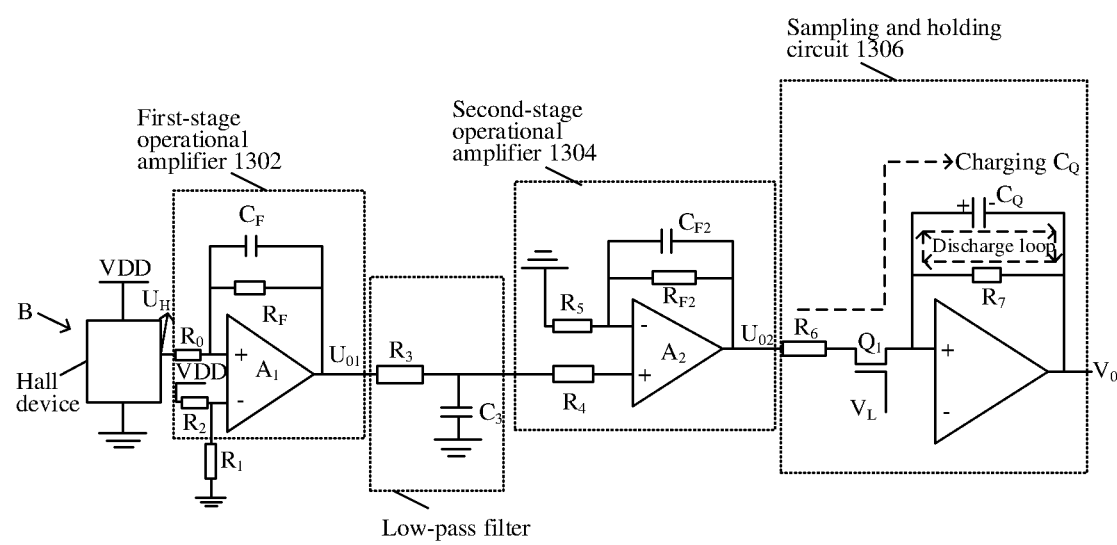
FIG. 13 is a schematic diagram illustrating a detection component according to some embodiments.

Specific descriptions will be made with the condition that the first vibration component 131 is controlled to vibrate and the driving signal is a differential signal as an example. The differential signal may generate the alternating magnetic field (a magnetic field intensity is B) in the coil of the first vibration component. FIG. 13 is a schematic diagram illustrating a detection component according to some embodiments. As shown in FIG. 13, a Hall device in the detection component may output a Haul voltage ($U_H$) based on a Hall effect, and the Hall voltage may include a voltage signal reflecting a change of the alternating magnetic field and a Hall bias voltage signal, so that the Hall bias voltage signal may be removed through a bias circuit formed by a resistor $R_1$ and a resistor $R_2$ to ensure that a signal input into a first-stage operational amplifier 1302 is the voltage signal reflecting the change of the alternating magnetic field.

The voltage signal reflecting the change of the alternating magnetic field may be sequentially amplified by the first-stage operational amplifier 1302 and amplified by a second-stage operational amplifier 1304 to increase a signal value thereof to be $U_{O2}$. The output voltage $U_{O2}$ of the second-stage operational amplifier 1304 may be input into a sampling and holding circuit 1306, and an output voltage of the sampling and holding circuit 1306 may be $V_O$. $V_O$ represents the output voltage of the sampling and holding circuit 1306 and is configured to represent the amplified voltage signal reflecting the change of the alternating magnetic field, and $V_O$ is equal to the output voltage ($U_{O2}$) of the second-stage operational amplifier 1304. For the first-stage operational amplifier 1302, a passband frequency is $$f_1 = \frac{1}{2\pi R_F C_F},$$

and a positive proportion is $$A_{O1} = \left(1 + \frac{R_F}{R_0}\right) U_H,$$

where π represents the ratio of the circumstance of a circle to the diameter, $R_F$ represents a resistance value of a resistor $R_F$ in the first-stage operational amplifier 1302, $C_F$ represents a capacitance value of a capacitor $C_F$ in the first-stage operational amplifier 1302, and $R_0$ represents a resistance value of a resistor $R_0$ in the first-stage operational amplifier 1302. For the second-stage operational amplifier 1304, a passband frequency is $$f_2 = \frac{1}{2\pi R_{F2} C_{F2}},$$

and a positive proportion is $$A_{O2} = \left(1 + \frac{R_{F2}}{R_5}\right) U_{O1},$$

where $R_{F2}$ represents a resistance value of a resistor $R_{F2}$ in the second-stage operational amplifier 1304, $C_{F2}$ is a capacitance value of a capacitor $C_{F2}$ in the second-stage operational amplifier 1304, $R_5$ represents a resistance value of a resistor $R_5$ in the second-stage operational amplifier 1304, and $U_{O1}$ represents an output voltage of the first-stage operational amplifier 1302.

Figure 14:
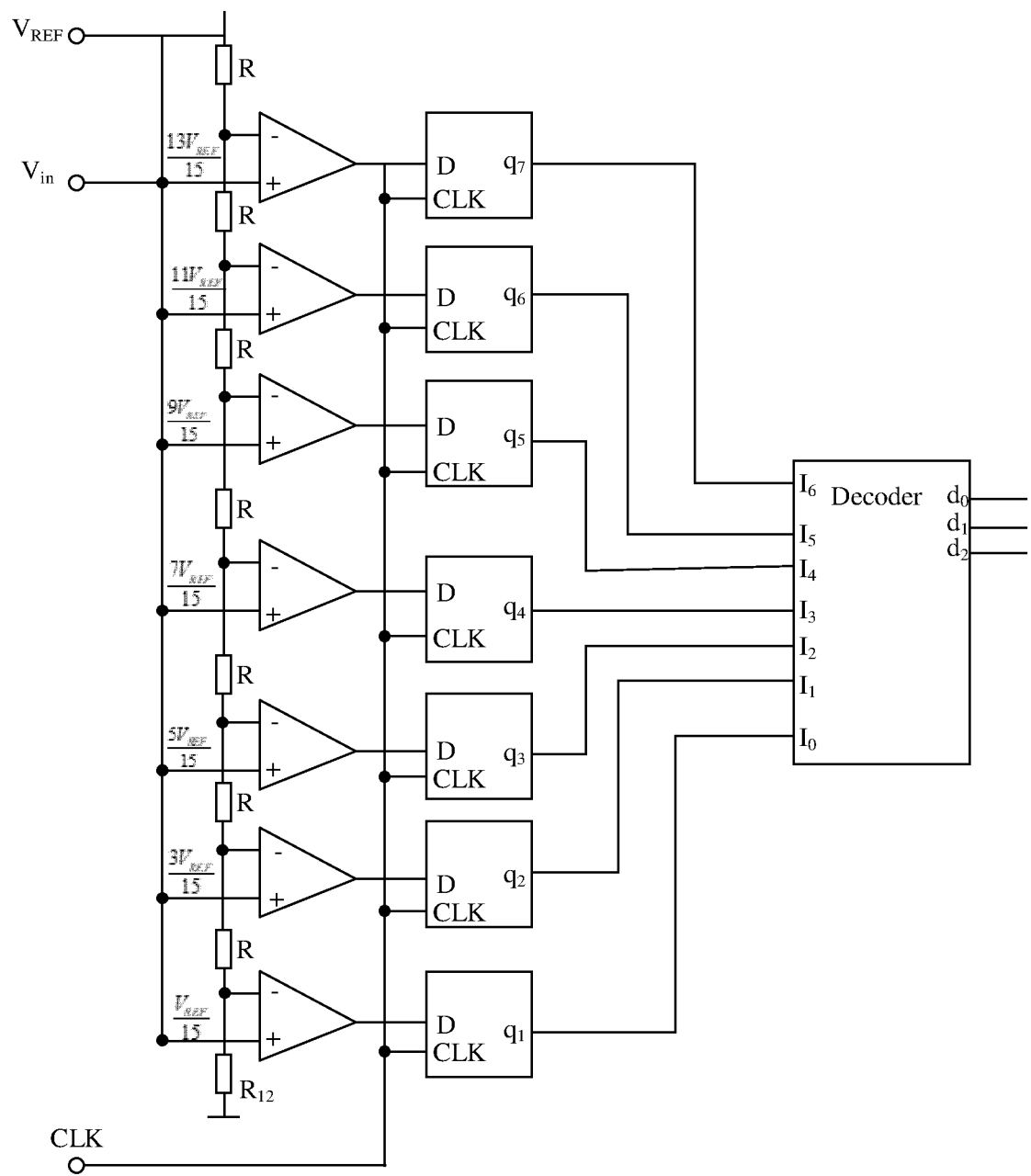
FIG. 14 is a schematic diagram illustrating a digital-to-analog conversion circuit according to some embodiments.

$V_O$ may be input into a digital-to-analog conversion circuit as shown in FIG. 14 to implement comparison between a frequency of the voltage signal reflecting the change of the alternating magnetic field and a resonance frequency of the first vibration component. It can be understood that, when the output voltage of the sampling and holding circuit 1306 is transmitted to the digital-to-analog conversion circuit, an output voltage signal value of the sampling and holding circuit 1306 may be in a voltage range that may be sampled by the digital-to-analog conversion circuit.

After the resonance frequency of the first vibration component is detected, the transistor $Q_1$ may be controlled to be switched off to stop working of the sampling and holding circuit 1306 and a post circuit thereof, and meanwhile, electric charges stored by a capacitor $C_Q$ may be consumed through a resistor $R_7$ to reduce power consumption.

A low-pass filter may further be included between an output end of the first-stage operational amplifier 1302 and an input end of the second-stage operational amplifier 1304, and the low-pass filter is configured to filter a high-frequency noise component. A frequency of the low-pass filter is $$f_3 = \frac{f}{2\pi R_3 C_3},$$

where $R_3$ represents a resistance value of a resistor $R_3$ in the low-pass filter, and $C_3$ represents a capacitance value of a capacitor $C_3$ in the low-pass filter.

In the embodiments of the present disclosure, the vibration frequency of the first vibration component and/or the vibration frequency of the second vibration component may be detected to obtain the detection result, and the driving signal for driving the first vibration component and/or the second vibration component to vibrate may be adjusted based on the detection result to control the vibration frequency of the first vibration component and/or the vibration frequency of the second vibration component in the preset frequency range, so that an effective vibration feedback may be provided for a user, and meanwhile, the probability of a poor user experience such as the piercing pain is reduced.

Figure 15:
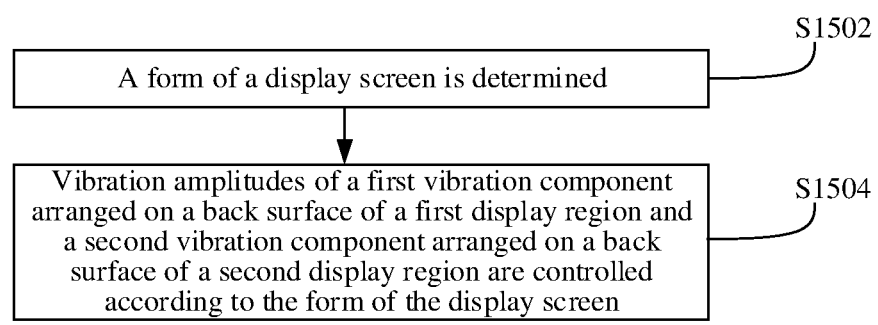
FIG. 15 is a flow chart showing a vibration control method according to some embodiments.

FIG. 15 is a flow chart showing a vibration control method according to some embodiments. The method may be applied to the mobile terminal 100 provided in the embodiments of the present disclosure. As shown in FIG. 15, the vibration control method includes the following steps.

In step S1502, a form of a display screen is determined, the display screen having a folded form and an unfolded form, a first display region and a second display region being overlapped in the folded form and the first display region and the second display region being separated in the unfolded form.

In step S1504, vibration amplitudes of a first vibration component arranged on a back surface of the first display region and a second vibration component arranged on a back surface of the second display region are controlled according to the form of the display screen.

In the embodiments, the form of the display screen may be determined, and the vibration amplitudes of the first vibration component and the second vibration component may be controlled according to the form of the display screen to further control a vibration amplitude of the mobile terminal, so that a requirement on control over the vibration amplitude of the mobile terminal in different forms of the display screen can be met, a foundation can be laid for improving consistency of vibration senses provided by the mobile terminal in the folded form and unfolded form of the display screen, and a user experience can be improved.

In some embodiments, step S1504 may include: responsive to the display screen being in the unfolded form, controlling the first vibration component and the second vibration component to vibrate at a first vibration amplitude; and responsive to the display screen being in the folded form, controlling the first vibration component or the second vibration component to vibrate at the first vibration amplitude, or responsive to the display screen being in the folded form, controlling the first vibration component and the second vibration component to vibrate at a second vibration amplitude, the second vibration amplitude being lower than the first vibration amplitude.

Responsive to the display screen being in the folded form, the first vibration component or the second vibration component may be controlled to vibrate at the first vibration amplitude or the first vibration component and the second vibration component may be controlled to vibrate at the second vibration amplitude lower than the first vibration amplitude, so that an interaction force between the first display region and the second display region during vibration may be reduced, impact of the interaction force on a vibration amplitude of the first display region or a vibration amplitude of the second display region may be reduced, and the consistency of the vibration amplitude in the folded form and unfolded form of the display screen can be improved, namely improvement of consistency of the vibration senses in the folded form and unfolded form of the display screen can be achieved.

In addition, compared with controlling the first vibration component or the second vibration component only to vibrate in the unfolded form of the display screen to cause vibration sense deficiency, controlling both the first vibration component and the second vibration component to vibrate in the unfolded form of the display screen may avoid vibration sense deficiency, that is only one display region vibrates and the other display region does not vibrate in the unfolded form of the display screen, which is favorable for ensuring a vibration feedback effect.

In some embodiments, the method may further include: responsive to the display screen being in the folded form, acquiring a state of the first display region and a state of the second display region, each of the state of the first display region and the state of the second display region including a working state and an idle state. Accordingly, step S1504 may include: controlling the first vibration component to vibrate, responsive to the display screen being in the folded form, the first display region being in the working state and the second display region being in the idle state, and controlling the second vibration component to vibrate, responsive to the display screen being in the folded form, the first display region being in the idle state and the second display region being in the working state.

Compared with driving the vibration component on the back surface of the display region in the idle state to vibrate when a user needs to be prompted, a user can timely receive a vibration feedback by acquiring the state of the first display region and the state of the second display region in the folded form of the display screen and, when the user is required to be prompted, controlling the vibration component on the back surface of the display region in the working state to vibrate.

In some embodiments, the method may further include: acquiring an included angle between the first display region and the second display region. Accordingly, step S1502 may include: responsive to the included angle between the first display region and the second display region being smaller than or equal to a first preset angle, determining that the display screen is in the folded form, and responsive to the included angle between the first display region and the second display region being larger than the first preset angle, determining that the display screen is in the unfolded form.

The included angle between the first display region and the second display region may be acquired, and the form of the display screen may be determined according to the included angle between the first display region and the second display region to further control the first vibration component and/or the second vibration component to vibrate.

In some embodiments, the acquiring the included angle between the first display region and the second display region may include: acquiring an attitude angle parameter of the first display region and an attitude angle parameter of the second display region; and determining the included angle between the first display region and the second display region according to the attitude angle parameter of the first display region and the attitude angle parameter of the second display region.

The attitude angle parameter of the first display region and the attitude angle parameter of the second display region may be acquired, and the included angle between the first display region and the second display region may be determined according to the attitude angle parameter of the first display region and the attitude angle parameter of the second display region.

In some embodiments, the method may further include: acquiring an acceleration of the first display region, an acceleration of the second display region and the attitude angle parameter of the second display region; and determining an orientation of a display surface of the first display region and an orientation of a display surface of the second display region according to a direction of the acceleration of the first display region, the attitude angle parameter of the first display region, a direction of the acceleration of the second display region and the attitude angle parameter of the second display region.

In an embodiment, the direction of the acceleration of the first display region and the direction of the acceleration of the second display region may be acquired through different acceleration sensors respectively.

The accuracy of determining the included angle between the first display region and the second display region may be improved and the vibration control accuracy may further be improved, according to the direction of the acceleration of the first display region, the attitude angle parameter of the first display region, the direction of the acceleration of the second display region and the attitude angle parameter of the second display region.

In some embodiments, a control component of the mobile terminal generates a driving signal for controlling the vibration amplitudes of the first vibration component and the second vibration component according to the form of the display screen; or a processing component of the mobile terminal generates a control signal according to the form of the display screen and sends the control signal to the control component of the mobile terminal, and the control component generates the driving signal for controlling the vibration amplitudes of the first vibration component and the second vibration component according to the control signal.

The control component may directly generate a driving signal in a hardware triggering manner to control the first vibration component and/or the second vibration component to vibrate, so that a vibration response of the mobile terminal is quickened; or the processing component may generate a control signal and send the control signal to the control component through the communication interface and the control component may generate a driving signal. Various manners may be adopted for generating the driving signal, and a control manner is flexible.

In some embodiments, the control component of the mobile terminal generates a driving signal with a first signal value; and the driving signal with the first signal value is converted into a driving signal with a second signal value, the second signal value being greater than the first signal value. The driving signal with the second signal value is configured to control the vibration amplitudes of the first vibration component and the second vibration component; and the driving signal with the second signal value, compared with the driving signal with the first signal value, may generate a stronger vibration damping force when the first vibration component and/or the second vibration component start/starts vibration or stop/stops vibration.

The signal value of the driving signal may be increased by a conversion circuit, the first vibration component and/or the second vibration component may be controlled via the driving signal with an increased signal value to vibrate; and the driving signal with the second signal value, compared with the driving signal with the first signal value, may generate a stronger vibration damping force when the first vibration component and/or the second vibration component start/starts vibration or stop/stops vibration. Therefore, an amplitude fading speed of a freely damped motion under the action of the vibration damping force may be increased to enable the first vibration component and/or the second vibration component to enter a steady state faster, namely vibration starting time is shortened.

In a vibration stop process, the first vibration component and/or the second vibration component may only perform freely damped motions under the action of the vibration damping force, so that the vibration stopping time of the first vibration component and/or the second vibration component is also shortened, along with increase of the amplitude fading speed of the freely damped motion.

Therefore, the vibration starting time and the vibration stopping time may be shortened, and a transient vibration effect of the mobile terminal may be improved.

In some embodiments, the method may further include: detecting a vibration frequency of the first vibration component and/or a vibration frequency of the second vibration component to obtain a detection result; and adjusting the driving signal for driving the first vibration component and/or the second vibration component to vibrate based on the detection result to control the vibration frequency of the first vibration component and/or the vibration frequency of the second vibration component within a preset frequency range.

The vibration frequency of the first vibration component and/or the vibration frequency of the second vibration component may be detected to obtain the detection result, and the driving signal for driving the first vibration component and/or the second vibration component to vibrate may be adjusted based on the detection result to control the vibration frequency of the first vibration component and/or the vibration frequency of the second vibration component within the preset frequency range, so that an effective vibration feedback may be provided for a user, and meanwhile, the probability of a poor user experience such as the piercing pain is reduced.

In an embodiment, a first vibration component may be controlled to vibrate. According to a theory of vibration mechanics, a vibration mechanical model may include the following relationships:

$$F = MA, \quad (1)$$

$$G = A/g, \text{ and} \quad (2)$$

$$a = T * \frac{mD(2\pi f)^2}{M}. \quad (3)$$

The vibration mechanical model may include the first vibration component and a mobile terminal. F represents an acting force applied to the mobile terminal by vibration of the first vibration component. M represents the mass of the mobile terminal. A represents an acceleration generated by the mobile terminal under the action of vibration of the first vibration component. G represents a vibrational touch unit of the mobile terminal. a represents an acceleration of the first vibration component in a vibration process. T represents a vibrational touch unit amplification coefficient of the first vibration component. m represents the mass of the first vibration component. D represents a vibration amplitude of the first vibration component. f represents a vibration frequency, and g represents a gravitational acceleration.

In a process of designing a mobile terminal, whether the mass (M) and vibration effect of the mobile terminal meet requirements may be evaluated according to design requirements and the relationships.

For example, a vibration sensor may be arranged at any part of the mobile terminal, and an acceleration of a mechanical load when motor vibrator drives the mobile terminal to vibrate may be tested through an acceleration test device. There may be a certain acceleration when the vibration sensor is arranged at any place, and a function about the acceleration of the first vibration component may be created. For example, a function relationship between the acceleration of the first vibration component and a position coordinate of the vibration sensor may be created.

Normally, the whole mobile terminal may have a three-dimensional acceleration spatial distribution function. A maximum value $A_{max}$ of the acceleration of the mobile terminal may be determined to determine a maximum vibrational touch unit, and whether a vibration effect meets a requirement may be further determined according to a relationship between the maximum vibrational touch unit and a preset vibrational touch unit range.

For example, when the maximum vibrational touch unit is in the preset vibrational touch unit range, it may be determined that the required vibration effect meets the requirement; and when the maximum vibrational touch unit is not in the preset vibrational touch unit range, it may be determined that the vibration effect does not meet the requirement.

The below is a mechanical model deduction process of the first vibration component according to some embodiments.

In a one-dimensional vibration system driven by a driving force with a frequency f, it may be set that $\vec{e}_x$ is an x-axis unit component and $\vec{e}_y$ is a y-axis unit component. The mass of the first vibration component is m, a tangential velocity of a motion of the first vibration component is $\vec{v}$, an x-axis velocity component of the first vibration component is $\vec{v}_x$, a y-axis velocity component is $\vec{v}_y$, an included angle between a velocity vector $\vec{v}$ and the axis x is θ, an initial velocity of the first vibration component is $v_0$, a rotation angular velocity of the first vibration component is ω, the acceleration of the first vibration component is $\vec{a}$, a radius for a circular motion of the first vibration component is r, a centripetal force applied to the first vibration component is $F_1$, and a rotation angle is θ=ωt. Then, $$\vec{v} = \vec{v}_x + \vec{v}_y = v_0 \cos\theta \vec{e}_x + v_0 \sin\theta \vec{e}_y, \quad (4)$$

$$\vec{a} = \frac{d\vec{v}}{dt} = \frac{d(v_0\cos\theta\vec{e}_x + v_0\sin\theta\vec{e}_y)}{dt} = v_0\omega(-\sin\theta\vec{e}_x + \cos\theta\vec{e}_y), \quad (5)$$

and $$|\vec{a}| = v_0\omega = r\omega^2 = \frac{v_0^2}{r}. \quad (6)$$

It can be understood according to the Newton second law that:

$$F_1 = m|\vec{a}| = mv_0\omega = mr\omega^2 = m\frac{v_0^2}{r}. \quad (7)$$

The rotation angular velocity for the circular motion is ω and the vibration frequency of the first vibration component is f, therefore, according to ω=2πf, $$F_1 = mr\omega^2 = mr(2\pi f)^2 \quad (8)$$

If the mass of the mobile terminal is M, then, under a certain driving force:

$$F_1 = ma = MA, \text{ and} \quad (9)$$

$$A = \frac{F_1}{M} = \frac{ma}{M} = \frac{mr\omega^2}{M} = \frac{mr(2\pi f)^2}{M}. \quad (10)$$

It can be understood from the deduction process that, for the one-dimensional vibration system driven by the driving force with the frequency f, a vibration quantity ∂ may meet the following directional proportional relationship:

$$\partial \propto \frac{mD(2\pi f)^2}{M}, \quad (11)$$

where D represents the vibration amplitude of the first vibration component, the frequency of the driving force being the same as the vibration frequency of the first vibration component. In practical use, the vibration quantity may usually be represented by a ratio of the acceleration a to the gravitational acceleration g. For example, it can be understood according to the formula (2) that a vibration quantity of 2 g represents that the vibration quantity is twice the gravitational acceleration g. According to the relationship, a theoretical vibration quantity ∂ of the first vibration component may be calculated through the following formula:

$$\partial = Z \times \left[\frac{mD(2\pi f)^2}{M} / \sqrt{2}\right] / 9.8, \quad (12)$$

where Z represents an amplification coefficient of the test device for the vibration quantity, a numerical value of the amplification coefficient being related to all factors of a probe position of the test device, a shape of the test device and the like and being not a constant. For a test device of a series 0832A for the first vibration component, the amplification coefficient Z may be about 2.7 or $2\sqrt{2}$. The theoretical vibration quantity may be obtained by dividing an obtained amplitude by $\sqrt{2}$ to obtain an effective value and dividing the effective value by the gravitational acceleration g, and is configured to measure vibration sensed by a user.

It can be found by analyzing the formula for the vibration quantity that, for a certain mobile terminal, the vibration quantity is related to the mass m of the first vibration component, the vibration amplitude D of the first vibration component and the frequency f of the driving force. However, the vibration amplitude D in the formula (12) may not be directly determined by the mass of the first vibration component but may be impacted by a damping coefficient and required to be independently researched.

In an embodiment, a damping force may be determined by considering the first vibration component as a viscous damping model. The viscous damping model may include a spring and a mass block which is connected with the spring and vibrates under the action of the driving force. There is the following relationship under the viscous damping model:

$$F_d = cv \quad (13),$$

where $F_d$ represents an overall damping force, and c represents a viscous damping coefficient taking N□s/m as a unit.

For the viscous damping model, a vibration equation may be represented as:

$$m\ddot{D} + c\dot{D} + kD = F_0 \sin\omega t \quad (14).$$

where k represents an elasticity coefficient of the spring, kD represents elasticity of the spring, and $F_0 \sin\omega t$ represents an acting force of a driving signal for controlling the first vibration component to vibrate on the mass block in the first vibration component.

If $$\frac{k}{m} = \omega_n^2 \text{ and } \frac{c}{m} = 2\xi\omega_n,$$

where ξ represents a damping ratio (ξ is a dimensionless parameter), the equation (14) may be represented as:

$$\ddot{D} + 2\xi\omega_n\dot{D} + \omega_n^2 D = \frac{F_0}{m}\sin\omega t. \quad (15)$$

If both a velocity and displacement of the mass block at an initial moment are 0, the equation (15) may be solved to obtain:

$$D(t) = A_1 e^{-\pi t} \sin(\omega_d t + \varphi) + B_1 \sin(\omega t - \varphi) \quad (16).$$

In a solution of the motion equation (16), $A_1 e^{-\pi t} \sin(\omega_d t + \varphi)$ represents a freely damped motion, and $B_1 \sin(\omega t - \varphi)$ represents a driven motion of the first vibration component driven by the driving signal output by the mobile terminal under the action of an internal Lorentz force. A particular solution in (16) is:

$$D = B_1 \sin(\omega t - \varphi) \quad (17),$$

where $B_1$ represents a first vibration amplitude, and φ represents a phase difference between a displacement phase of the first vibration component and a phase of the driving signal. The formula (17) may be configured to represent a steady response relationship of controlling the first vibration component to vibrate in an alternating magnetic field generated by the driving signal output by a control component in a coil of the first vibration component. A frequency in the formula (17) may be the same as a frequency of the driving signal. If $$\lambda = \frac{\omega}{\omega_n},$$

λ representing a frequency ratio configured to represent a ratio of the frequency ω of the driving signal and a natural frequency $\omega_n$ of the first vibration component, then there is:

$$B_1 = \frac{F_0/k}{\sqrt{(1-\lambda^2)^2 + (2\xi\lambda)^2}}, \text{ and} \quad (18)$$

$$\varphi = \tan^{-1}\frac{2\xi\lambda}{1-\lambda^2}. \quad (19)$$

If $B_0=F_0/k$, $B_0$ representing a second vibration amplitude under a fixed driving force, then a ratio of the first vibration amplitude $B_1$ to the second vibration amplitude $B_0$ is represented as a vibration amplitude amplification factor β, as shown in the formula (20). The vibration amplitude amplification factor may be determined by the damping force and the frequency:

$$\beta = \frac{B_1}{B_0} = \frac{1}{\sqrt{(1-\lambda^2)^2 + (2\xi\lambda)^2}}, \text{ and} \quad (20)$$

$$\lambda = \sqrt{1-2\xi^2}. \quad (21)$$

When the formula (21) is true, the vibration amplitude amplification factor β is maximum. When λ=1, resonance may be generated, the vibration amplitude amplification factor is $$\beta = \frac{1}{2\xi},$$

and the phase difference between the phase of the driving force generated by the driving signal and the displacement phase is π/2. It is indicated that the driving force is maximum when the displacement of the mass block is 0 and that the driving force is 0 when the displacement of the mass block is maximum.

The first vibration amplitude may meet the following relational expression:

$$B_1 = \frac{F_0}{c\omega_n} = \frac{F_0}{2\xi k}. \quad (22)$$

It can be understood from the formula (22) that the first vibration amplitude is impacted by the driving force, the damping and the elasticity coefficient of the spring.

A steady vibration process of the mass block in the first vibration component is demonstrated above. However, transient analysis about vibration starting and vibration stopping is needed to be additionally described.

Figure 8:
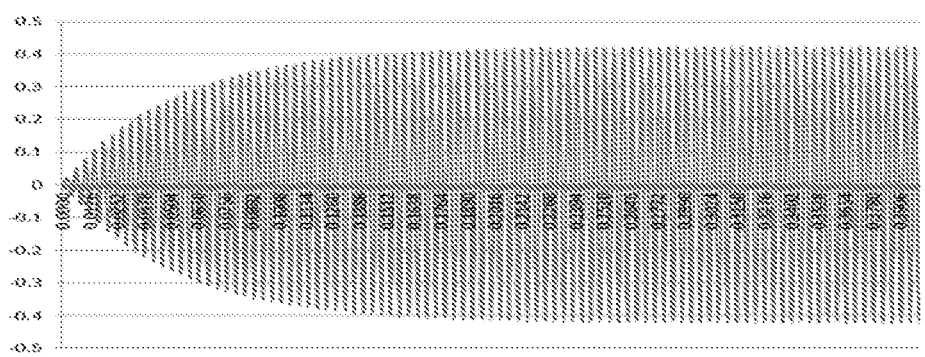
FIG. 8 is a motion diagram of a vibration start process according to some embodiments.
Figure 9:
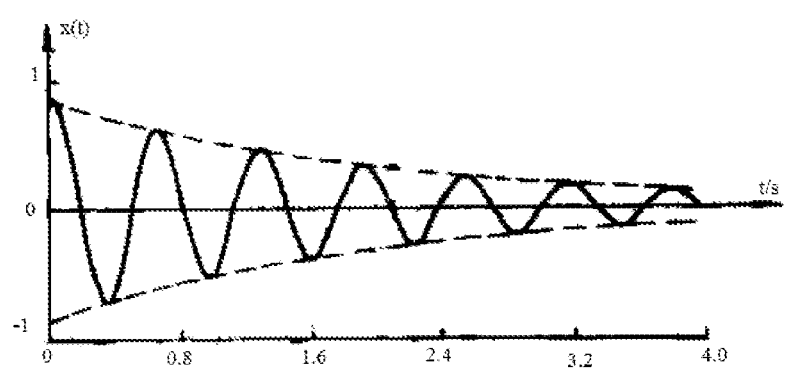
FIG. 9 is a motion diagram of a vibration stop process according to some embodiments.

FIG. 8 is a damped vibration curve according to some embodiments. When the driving force provided by a system electric signal disappears, under the action of the vibration damping force, a vibration state of the first vibration component may be switched from steady vibration to simple harmonic vibration with the vibration amplitude fading according to an exponential rule, called damped vibration.

For a damping system considering damping, a natural frequency may be represented as $\omega_d=\omega_n\sqrt{1-\xi^2}$. An equation for damped vibration may be represented as:

$$D(t)=A_1 e^{-\xi\omega_n t}\sin(\omega_d t+\varphi) \quad (23).$$

An amplitude fading coefficient η may be set to be:

$$\eta = \frac{A_{1(i)}}{A_{1(i+1)}} = e^{\xi\omega_n t_d}. \quad (24)$$

The amplitude fading coefficient is configured to represent a fading speed. A logarithm of η may be calculated to obtain a logarithmic fading rate δ:

$$\delta = \ln\frac{A_{1(i)}}{A_{1(i+1)}} = \frac{2\pi\xi}{\sqrt{1-\xi^2}} = \xi\omega_n t_d. \quad (25)$$

Therefore, the damping ratio for system vibration may be calculated according to the damped vibration curve. It can be understood that, the higher the damping ratio is, the higher the logarithmic fading rate and the fading speed are. In a damping process that the vibration quantity of the first vibration component is reduced from 100% to 10%, the following relationship may be met:

$$\ln 9 = \xi\omega_n t_{brake} \quad (26),$$

where braking time $t_{brake}$ represents time when the vibration quantity of the first vibration component is reduced from 100% to 10%. It can be understood according to the equation (26) that, in the damping process that the vibration quantity of the first vibration component is reduced from 100% to 10%, if the damping ratio of the first vibration component is higher, the braking time is shorter. The braking time $t_{brake}$ may be considered as a required time length from a moment when the driving force on the first vibration component is released to a moment when the first vibration component stops vibration.

It can be understood based on the above analysis that the motion equation of the first vibration component is as follows:

$$m\ddot{D} + c\dot{D} + kD = \frac{BVL}{R}\sin\omega t. \quad (27)$$

At the initial moment, the displacement of the first vibration component is $D_0$, the velocity of the first vibration component is $\dot{D}_0$, and the formula (27) may be solved to obtain:

$$D(t)e^{-\xi\omega_n t}\left(D_0\cos\omega_d + \frac{\dot{D}_0 + \xi\omega_n D_0}{\omega_d}S\sin\omega_d t\right) + \qquad (28)$$

$$B_1 e^{-\xi\omega_n t}\left[\sin\varphi\cos\omega_d + \frac{\omega_n}{\omega_d}(\xi\sin\varphi - \lambda\cos\varphi)\sin\omega_d t\right] + B_1\sin(\omega t - \varphi).$$

It may be set that both the velocity and displacement of the first vibration component at the initial moment are 0 and the vibration amplitude of the free accompanying vibration under the damping action gradually fades to 0 according to $e^{-\xi\omega_n t}$, so that an equation for a vibration waveform in a vibration stop process of the first vibration component meets the following relationship:

$$D(t)=B_1\sin(\omega t-\varphi) \qquad (29).$$

The formula (29) may represent the driven motion of the first vibration component under the internal Lorentz force.

Figure 16:
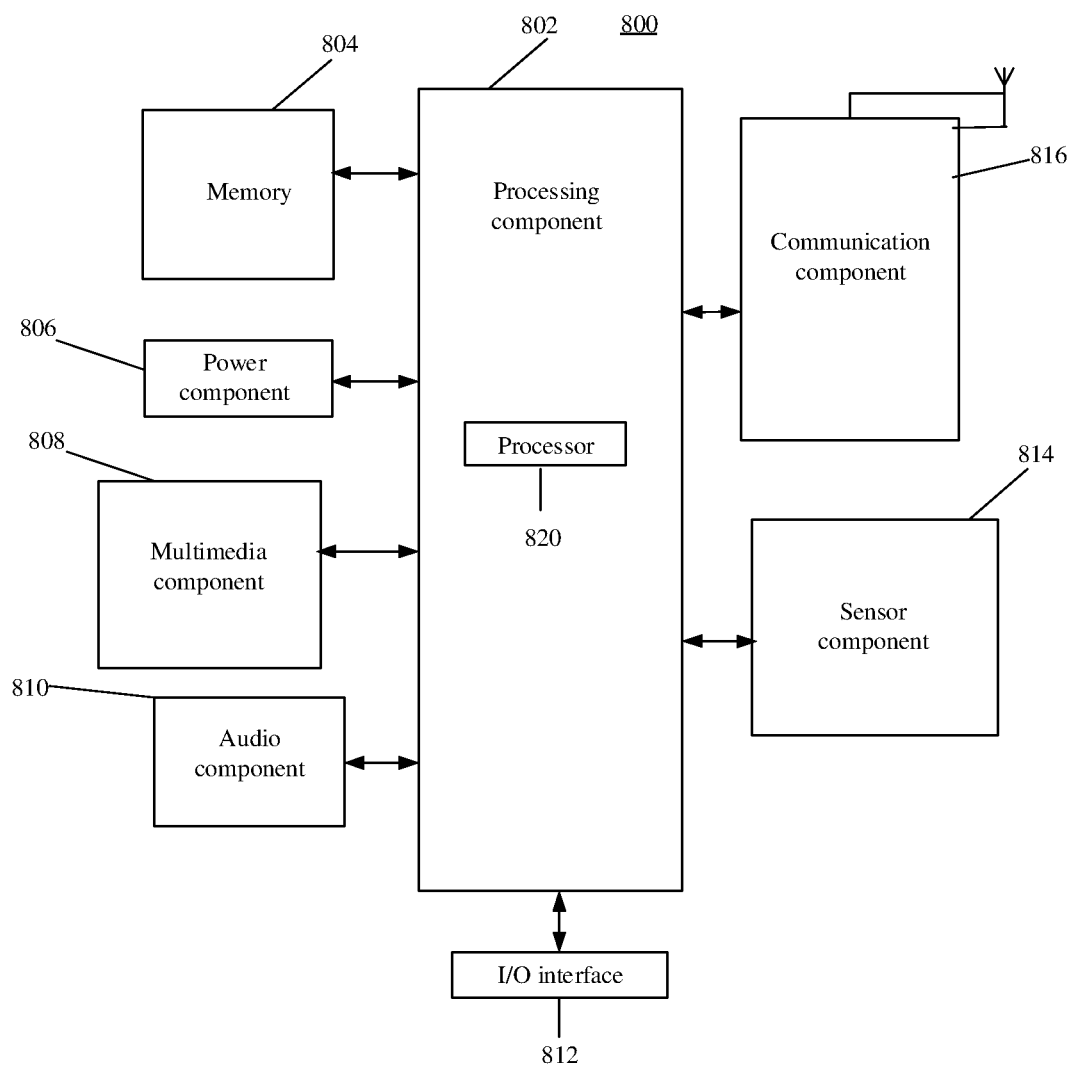
FIG. 16 is a block diagram of a vibration control device according to some embodiments.

FIG. 16 is a block diagram of a vibration control device 800 according to some embodiments. For example, the device 800 may be a mobile phone, a computer, a digital broadcast terminal, a messaging device, a gaming console, a tablet, a medical device, exercise equipment, a personal digital assistant and the like.

Referring to FIG. 16, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 is typically configured to control overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may further include one or more components which facilitate interaction between the processing component 802 and the other components. For instance, the processing component 802 may include a multimedia component to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 may include a power management system, one or more power supplies, and other components associated with generation, management and distribution of power for the device 800.

The multimedia component 808 may include a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and/or the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 is configured to provide an interface between the processing component 802 and a peripheral interface, and the peripheral interface may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a Wireless Fidelity (WiFi) network, a 4th-Generation (4G) or 5th-Generation (5G) network or a combination thereof. In some embodiments, the communication component 816 receives a broadcast signal or broadcast associated information from an external broadcast management system through a broadcast channel. In some embodiments, the communication component 816 further includes a Near Field Communication (NFC) component to facilitate short-range communication. In some embodiments, the communication component 816 may be implemented based on a Radio Frequency Identification (RFID) technology, an Infrared Data Association (IrDA) technology, an Ultra-WideBand (UWB) technology, a Bluetooth (BT) technology or another technology.

In some embodiments, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including instructions, such as the memory 804 including instructions, and the instructions may be executed by the processor 820 of the device 800 to implement the vibration control method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, instructions in the storage medium may be executed by a processor of a mobile terminal to enable the mobile terminal to implement the steps in the vibration control method provided in the embodiments of the present disclosure.

Other embodiments of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A mobile terminal, comprising:
    a shell;
    a display screen arranged on a surface of the shell, the display screen comprising a first display region and a second display region;
    a first vibration component, arranged in the shell and on a back surface of the first display region;
    a second vibration component, arranged in the shell and on a back surface of the second display region;
    a processor, arranged in the shell and configured to determine a form of the display screen, wherein the display screen has a folded form and an unfolded form, the first display region and the second display region are overlapped in the folded form, and the first display region and the second display region are separated in the unfolded form;
    a controller, arranged in the shell and connected with the processor, the first vibration component, and the second vibration component, the controller being configured to control vibration amplitudes of the first vibration component and the second vibration component according to the determined form of the display screen; and
    a state acquisition component, arranged in the shell and connected with the controller, the state acquisition component being configured to, responsive to the display screen being in the folded form, acquire a state of the first display region and a state of the second display region, each of the state of the first display region and the state of the second display region comprising a working state and an idle state,
    wherein the controller is configured to:
    control the first vibration component to vibrate, responsive to the display screen being in the folded form, the first display region being in the working state and the second display region being in the idle state, and
    control the second vibration component to vibrate, responsive to the display screen being in the folded form, the first display region being in the idle state and the second display region being in the working state.

2. The mobile terminal of claim 1, wherein the controller is configured to:
    responsive to the display screen being in the unfolded form, control the first vibration component and the second vibration component to vibrate at a first vibration amplitude; and
    responsive to the display screen being in the folded form, control one of the first vibration component or the second vibration component to vibrate at the first vibration amplitude; or control the first vibration component and the second vibration component to vibrate at a second vibration amplitude, the second vibration amplitude being lower than the first vibration amplitude.

3. The mobile terminal of claim 1, further comprising:
    an included angle acquisition component, arranged in the shell and connected with the processor, the included angle acquisition component being configured to acquire an included angle between the first display region and the second display region,
    wherein the processor is configured to:
    responsive to the included angle between the first display region and the second display region being smaller than or equal to a first preset angle, determine that the display screen is in the folded form; and
    responsive to an included angle between an orientation of a display surface of the first display region and an orientation of a display surface of the second display region being larger than the first preset angle, determine that the display screen is in the unfolded form.

4. The mobile terminal of claim 3, wherein the included angle acquisition component comprises:
    a first angular velocity sensor arranged on the back surface of the first display region, the first angular velocity sensor being configured to acquire an attitude angle parameter of the first display region, and
    a second angular velocity sensor arranged on the back surface of the second display region, the second angular velocity sensor being configured to acquire an attitude angle parameter of the second display region;
    wherein the included angle acquisition component is configured to determine the included angle between the first display region and the second display region according to the attitude angle parameter of the first display region and the attitude angle parameter of the second display region.

5. The mobile terminal of claim 4, wherein the included angle acquisition component further comprises:

a first acceleration sensor arranged on the back surface of the first display region, the first acceleration sensor being configured to acquire an acceleration of the first display region, and a second acceleration sensor arranged on the back surface of the second display region, the second acceleration sensor being configured to acquire an acceleration of the second display region;

wherein the included angle acquisition component is configured to determine the included angle between the first display region and the second display region according to a direction of the acceleration of the first display region, the attitude angle parameter of the first display region, a direction of the acceleration of the second display region, and the attitude angle parameter of the second display region.

6. The mobile terminal of claim 1, wherein:

the controller is configured to generate a driving signal for controlling the vibration amplitudes of the first vibration component and the second vibration component according to the determined form of the display screen; or the processor is configured to generate a control signal according to the determined form of the display screen and send the control signal to the controller, and the controller is configured to generate a driving signal for controlling the vibration amplitudes of the first vibration component and the second vibration component according to the control signal.

7. The mobile terminal of claim 1, wherein the controller is configured to generate a driving signal with a first signal value; and the mobile terminal further comprises:

a conversion component, configured to convert the driving signal with the first signal value into a driving signal with a second signal value, the second signal value being greater than the first signal value, wherein the driving signal with the second signal value is configured to control the vibration amplitudes of the first vibration component and the second vibration component, and the driving signal with the second signal value, compared with the driving signal with the first signal value, is configured to generate a stronger vibration damping force when at least one of the first vibration component or the second vibration component starts vibration or stops vibration.

8. The mobile terminal of claim 1, wherein the shell comprises:

a rear cover, and a middle frame;

wherein the first vibration component and the second vibration component are arranged on the middle frame or in different edge regions of the rear cover.

9. A vibration control method, comprising:

determining a form of a display screen of a mobile terminal, wherein the display screen includes a first display region and a second display region, and has a folded form and an unfolded form, wherein the first display region and the second display region are overlapped in the folded form, and the first display region and the second display region are separated in the unfolded form;

controlling vibration amplitudes of a first vibration component arranged on a back surface of the first display region and a second vibration component arranged on a back surface of the second display region according to the determined form of the display screen; and responsive to the display screen being in the folded form, acquiring a state of the first display region and a state of the second display region, each of the state of the first display region and the state of the second display region comprising a working state and an idle state, wherein controlling the vibration amplitudes of the first vibration component arranged on the back surface of the first display region and the second vibration component arranged on the back surface of the second display region according to the determined form of the display screen comprises:

controlling the first vibration component to vibrate, responsive to the display screen being in the folded form, the first display region being in the working state and the second display region being in the idle state; and controlling the second vibration component to vibrate, responsive to the display screen being in the folded form, the first display region being in the idle state and the second display region being in the working state.

10. The vibration control method of claim 9, wherein controlling the vibration amplitudes of the first vibration component arranged on the back surface of the first display region and the second vibration component arranged on the back surface of the second display region according to the determined form of the display screen comprises:

responsive to the display screen being in the unfolded form, controlling the first vibration component and the second vibration component to vibrate at a first vibration amplitude; and responsive to the display screen being in the folded form, controlling one of the first vibration component or the second vibration component to vibrate at the first vibration amplitude, or controlling the first vibration component and the second vibration component to vibrate at a second vibration amplitude, the second vibration amplitude being lower than the first vibration amplitude.

11. The vibration control method of claim 9, further comprising:

acquiring an included angle between the first display region and the second display region, wherein determining the form of the display screen comprises:

responsive to the included angle between the first display region and the second display region being smaller than or equal to a first preset angle, determining that the display screen is in the folded form; and responsive to the included angle between the first display region and the second display region being larger than the first preset angle, determining that the display screen is in the unfolded form.

12. The vibration control method of claim 11, wherein determining the form of the display screen comprises:

acquiring an attitude angle parameter of the first display region and an attitude angle parameter of the second display region; and determining the included angle between the first display region and the second display region according to the attitude angle parameter of the first display region and the attitude angle parameter of the second display region.

13. The vibration control method of claim 12, further comprising:

acquiring an acceleration of the first display region and an acceleration of the second display region; and determining the included angle between the first display region and the second display region according to a direction of the acceleration of the first display region, the attitude angle parameter of the first display region, a direction of the acceleration of the second display region, and the attitude angle parameter of the second display region.

14. The vibration control method of claim 9, further comprising one of:
   generating a driving signal by a controller of the mobile terminal for controlling the vibration amplitudes of the first vibration component and the second vibration component according to the determined form of the display screen; or
   generating a control signal by a processor of the mobile terminal according to the determined form of the display screen and sending the control signal to the controller of the mobile terminal, and generating a driving signal by the controller for controlling the vibration amplitudes of the first vibration component and the second vibration component according to the control signal.

15. The vibration control method of claim 9, further comprising:
   generating a driving signal with a first signal value; and
   converting the driving signal with the first signal value into a driving signal with a second signal value, the second signal value being greater than the first signal value,
   wherein the driving signal with the second signal value is configured to control the vibration amplitudes of the first vibration component and the second vibration component, and the driving signal with the second signal value, compared with the driving signal with the first signal value, is configured to generate a stronger vibration damping force when at least one of the first vibration component or the second vibration component starts vibration or stops vibration.

16. A non-transitory computer-readable storage medium having stored thereon instructions that, when executed by a processor of a mobile terminal, cause the mobile terminal to implement the vibration control method of claim 9.

17. A vibration control device, comprising:
   a processor; and
   a memory configured to store instructions executable by the processor,
   wherein the processor is configured to:
      determine a form of a display screen including a first display region and a second display region, wherein the display screen has a folded form and an unfolded form, the first display region and the second display region are overlapped in the folded form, and the first display region and the second display region are separated in the unfolded form;
      control vibration amplitudes of a first vibration component arranged on a back surface of the first display region and a second vibration component arranged on a back surface of the second display region according to the determined form of the display screen; and
      responsive to the display screen being in the folded form, acquire a state of the first display region and a state of the second display region, each of the state of the first display region and the state of the second display region comprising a working state and an idle state,
      wherein, to control the vibration amplitudes of the first vibration component arranged on the back surface of the first display region and the second vibration component arranged on the back surface of the second display region according to the determined form of the display screen, the processor is configured to:
         control the first vibration component to vibrate, responsive to the display screen being in the folded form, the first display region being in the working state and the second display region being in the idle state; and
         control the second vibration component to vibrate, responsive to the display screen being in the folded form, the first display region being in the idle state and the second display region being in the working state.

18. The vibration control device of claim 17, wherein the processor is further configured to:
   responsive to the display screen being in the unfolded form, control the first vibration component and the second vibration component to vibrate at a first vibration amplitude; and
   responsive to the display screen being in the folded form, control one of the first vibration component or the second vibration component to vibrate at the first vibration amplitude, or control the first vibration component and the second vibration component to vibrate at a second vibration amplitude, the second vibration amplitude being lower than the first vibration amplitude.

* * * * *